United States Patent
Kim et al.

(10) Patent No.: US 12,212,164 B2
(45) Date of Patent: Jan. 28, 2025

(54) METHOD OF BATTERY CELL ACTIVATION USING ACTIVATION TRAY

(71) Applicant: LG ENERGY SOLUTION, LTD., Seoul (KR)

(72) Inventors: So Hee Kim, Daejeon (KR); Nak Gi Sung, Daejeon (KR); Joon Sung Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/516,920

(22) Filed: Nov. 21, 2023

(65) Prior Publication Data
US 2024/0113529 A1 Apr. 4, 2024

Related U.S. Application Data

(63) Continuation of application No. 16/979,711, filed on Sep. 10, 2020, now Pat. No. 11,929,630, which is a
(Continued)

(30) Foreign Application Priority Data

Jan. 16, 2019 (KR) .................. 10-2019-0005903

(51) Int. Cl.
*H02J 7/00* (2006.01)
*H01M 10/44* (2006.01)
*H01M 4/04* (2006.01)

(52) U.S. Cl.
CPC ........... *H02J 7/0013* (2013.01); *H01M 10/44* (2013.01); *H01M 10/441* (2013.01);
(Continued)

(58) Field of Classification Search
CPC .......... H02J 7/0013; H02J 7/00; H02J 7/0014; H02J 7/0042; H02J 7/0045; H01M 10/44;
(Continued)

(56) References Cited

U.S. PATENT DOCUMENTS

| 5,729,117 A | 3/1998 | Fukuda |
| 6,377,030 B1 | 4/2002 | Asao et al. |

(Continued)

FOREIGN PATENT DOCUMENTS

| EP | 2355205 B1 | 11/2012 |
| JP | 10-79263 A | 3/1998 |

(Continued)

OTHER PUBLICATIONS

Chinese Office Action and Search Report for corresponding Chinese Application No. 202080001867.X, dated Aug. 12, 2023, with partial English translation.
(Continued)

*Primary Examiner* — Richard Isla
*Assistant Examiner* — Manuel Hernandez
(74) *Attorney, Agent, or Firm* — Mincheol Kim

(57) ABSTRACT

A secondary battery charging method includes a step for introducing a plurality of battery cells onto an activation tray and CC-charging the battery cells; and a step for connecting the plurality of battery cells in parallel. The charging method shortens the time typically required for CV-charging by connecting battery cells in parallel after CC-charging, thus having the effect of replacing CV-charging.

10 Claims, 9 Drawing Sheets

Related U.S. Application Data continuation of application No. PCT/KR2020/000807, filed on Jan. 16, 2020.

(52) U.S. Cl.
CPC ............ *H01M 10/446* (2013.01); *H02J 7/00* (2013.01); *H02J 7/0014* (2013.01); *H02J 7/0042* (2013.01); *H02J 7/0045* (2013.01); *H01M 4/0447* (2013.01)

(58) Field of Classification Search
CPC . H01M 10/441; H01M 10/446; H01M 4/0447
USPC .................. 320/103, 107, 112, 113, 126, 137
See application file for complete search history.

(56) References Cited

U.S. PATENT DOCUMENTS

| | | | |
|---|---|---|---|
| 6,627,345 | B1 | 9/2003 | Zemlok et al. |
| 6,782,605 | B1 | 8/2004 | Stocchiero |
| 8,859,121 | B2 | 10/2014 | Seto |
| 9,705,350 | B2 | 7/2017 | Masato |
| 11,075,526 | B2 | 7/2021 | Niizuma |
| 2010/0330404 | A1 | 12/2010 | Nishino et al. |
| 2011/0177365 | A1 | 7/2011 | Yasui et al. |
| 2016/0190834 | A1 | 6/2016 | Minakuchi et al. |
| 2019/0334143 | A1 | 10/2019 | Sugeno |
| 2020/0044233 | A1* | 2/2020 | Choi .................. H01M 10/058 |

FOREIGN PATENT DOCUMENTS

| | | | |
|---|---|---|---|
| JP | 2000-106219 A | 4/2000 | |
| JP | 3057556 B2 | 6/2000 | |
| JP | 2001178005 A | 6/2001 | |
| JP | 2002-298806 A | 10/2002 | |
| JP | 2003-109671 A | 4/2003 | |
| JP | 3721706 B2 | 11/2005 | |
| JP | 2008-95155 A | 4/2008 | |
| JP | 2010160955 A | 7/2010 | |
| JP | 2011-108550 A | 6/2011 | |
| JP | 4993935 B2 | 8/2012 | |
| JP | 2014-235935 A | 12/2014 | |
| JP | 5895970 B2 | 4/2015 | |
| JP | 2017-17853 A | 1/2017 | |
| JP | 2017-21944 A | 1/2017 | |
| JP | 6179232 B2 | 8/2017 | |
| JP | 5944481 B2 | 7/2018 | |
| KR | 10-0451417 B1 | 10/2004 | |
| KR | 10-0542693 B1 | 1/2006 | |
| KR | 10-0782886 B1 | 12/2007 | |
| KR | 10-2010-0123828 A | 11/2010 | |
| KR | 10-2015-0015303 A | 2/2015 | |
| KR | 10-2015-0049972 A | 5/2015 | |
| KR | 10-2017-0059602 A | 5/2017 | |
| KR | 10-1758800 B1 | 7/2017 | |
| KR | 10-2017-0138140 A | 12/2017 | |
| KR | 10-1833567 B | 2/2018 | |
| KR | 10-2018-0082769 A | 7/2018 | |
| KR | 10-2018-0092029 A | 8/2018 | |
| WO | WO-2017004078 A1 * | 1/2017 | ............ B60L 1/003 |
| WO | WO 2018/131221 A1 | 7/2018 | |

OTHER PUBLICATIONS

Korean Office Action with English Translation mailed Jun. 13, 2022 in KR 10-2019-0005903.
International Search Report (PCT/ISA/210) issued in PCT/KR2020/000807, dated May 6, 2020.

* cited by examiner

[FIG. 1]
Prior Art
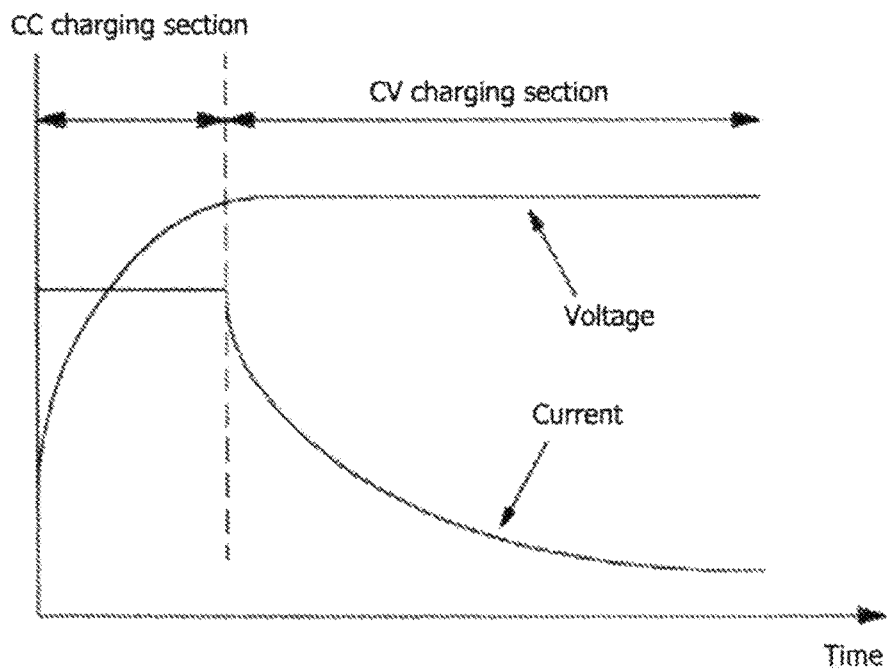
[FIG. 2]
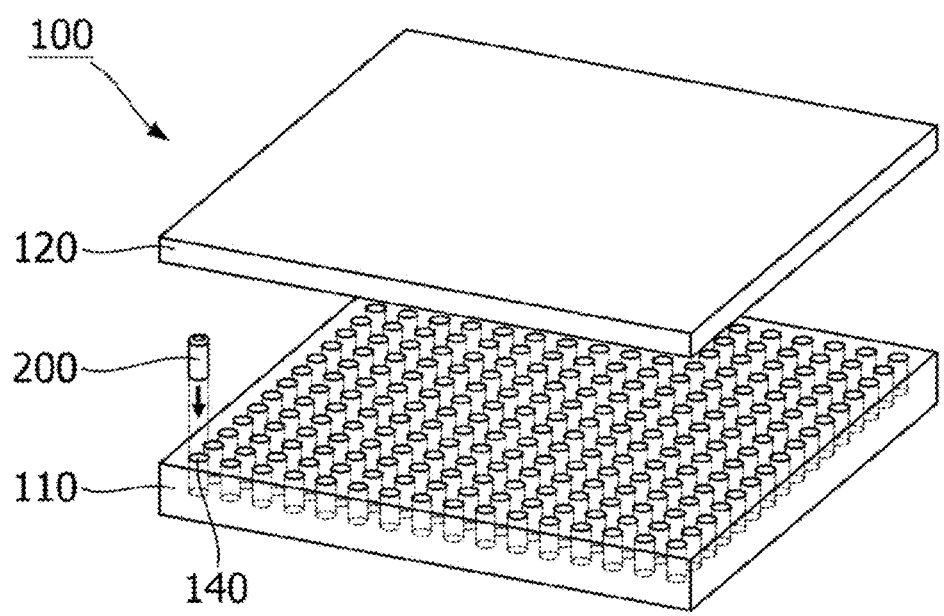

[FIG. 3]
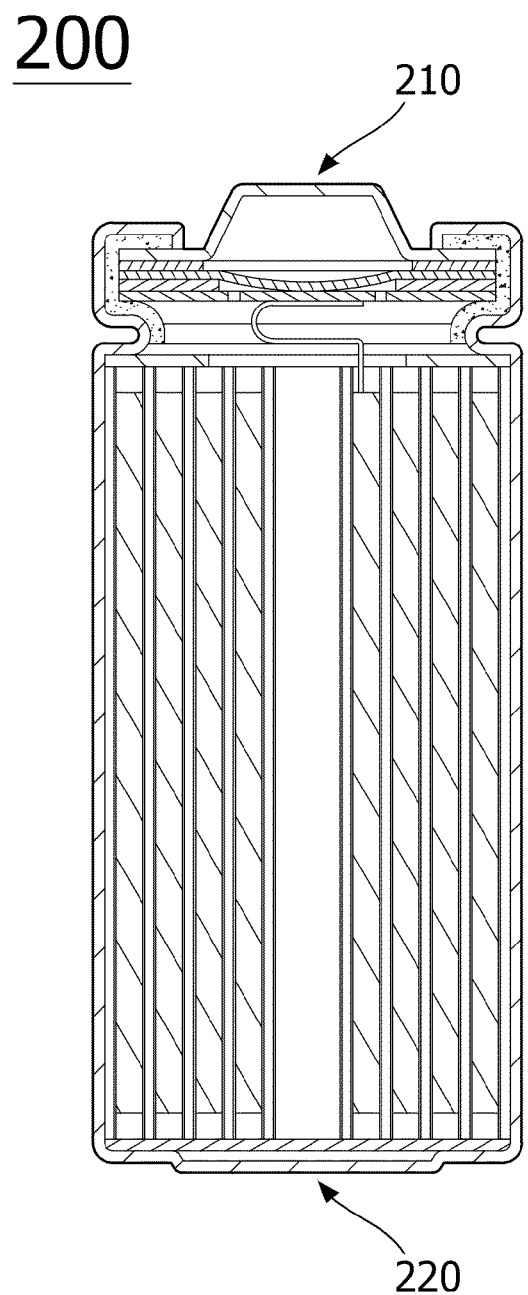

[FIG. 4]
110
(a)
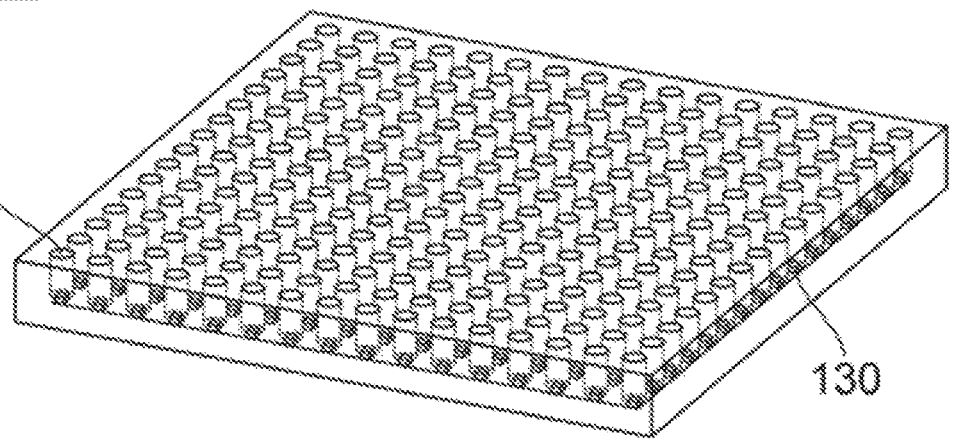
(b)
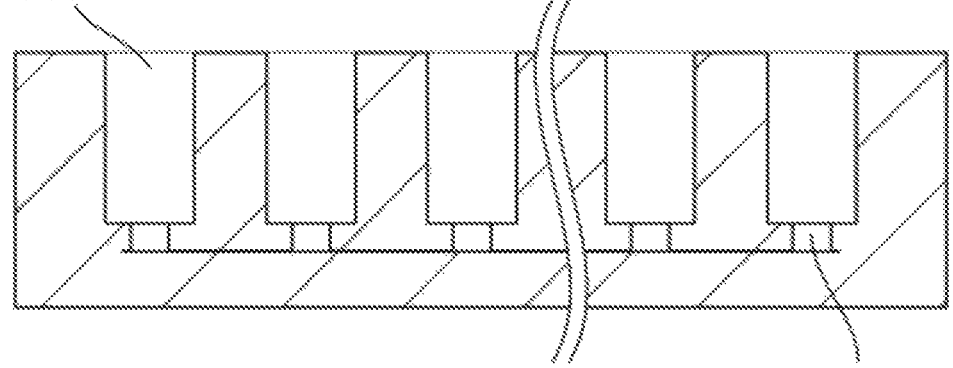
(c)
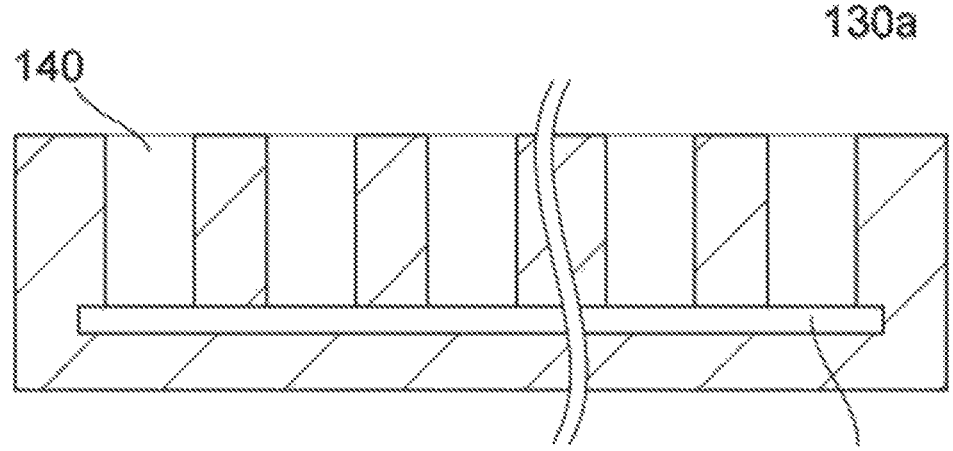

[FIG. 5]
(a)
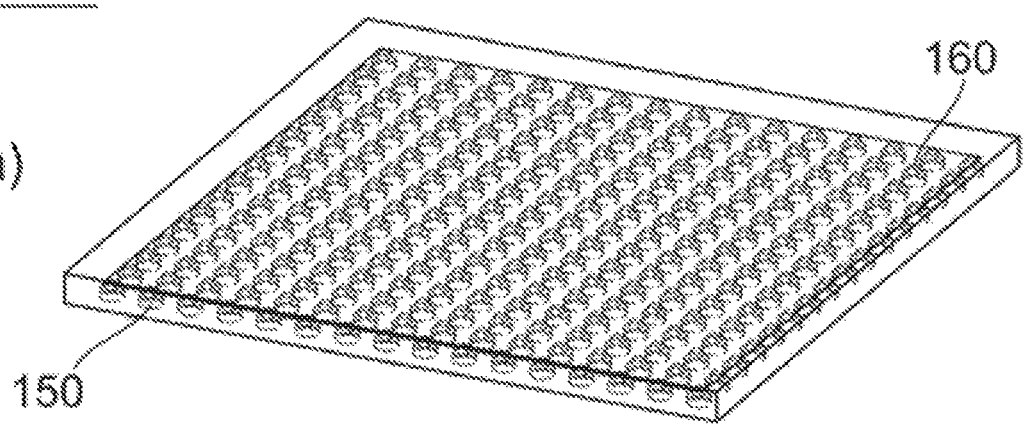
(b)
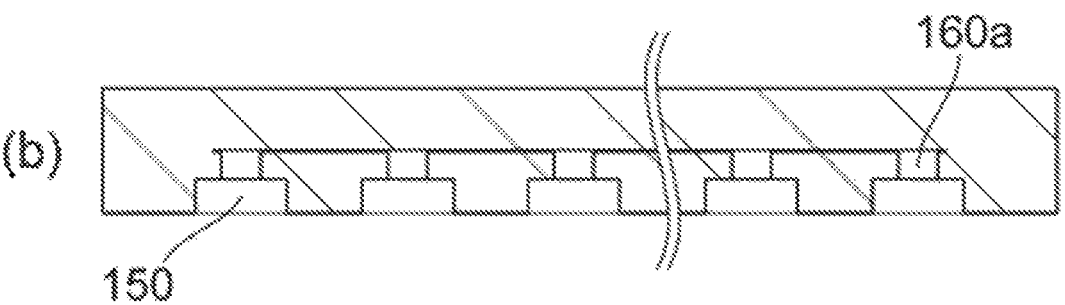
(c)
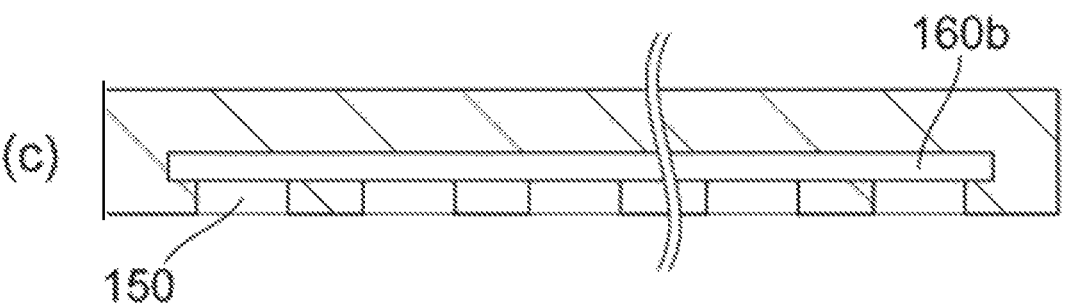

【FIG. 6】
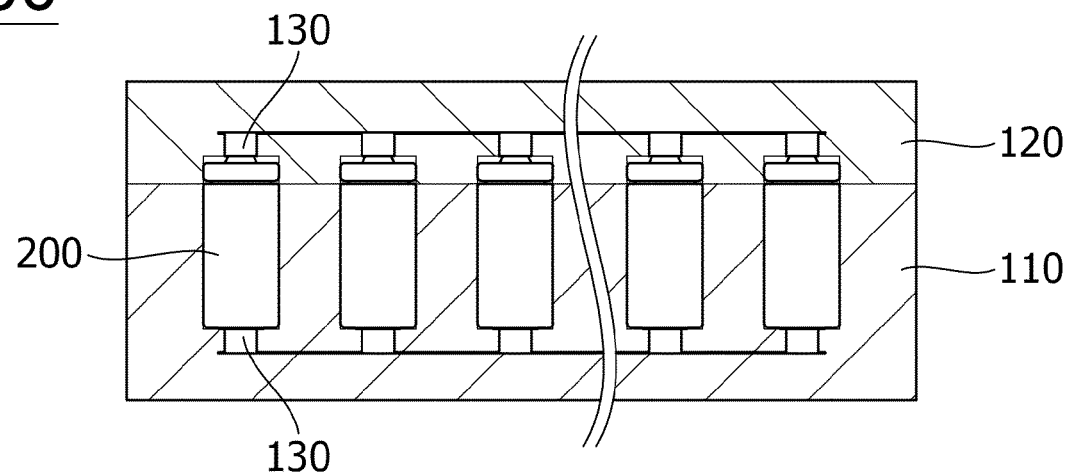
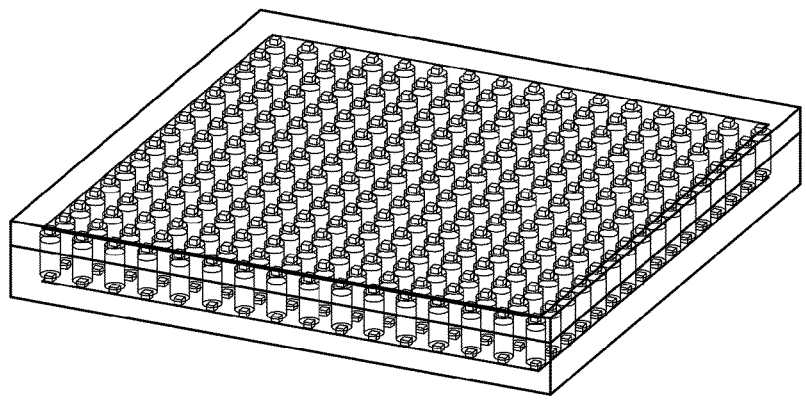
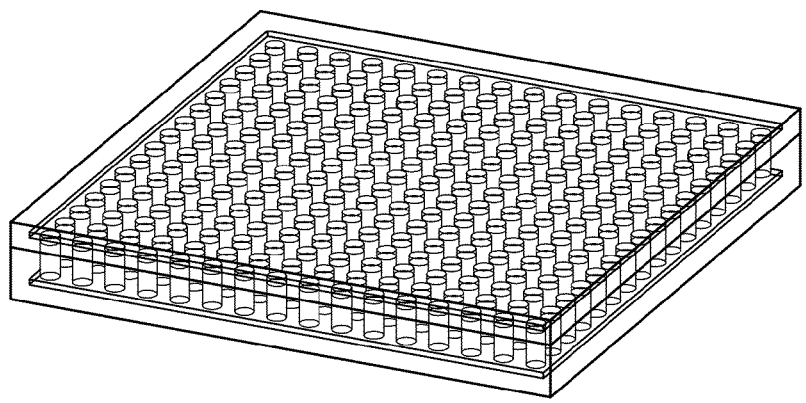

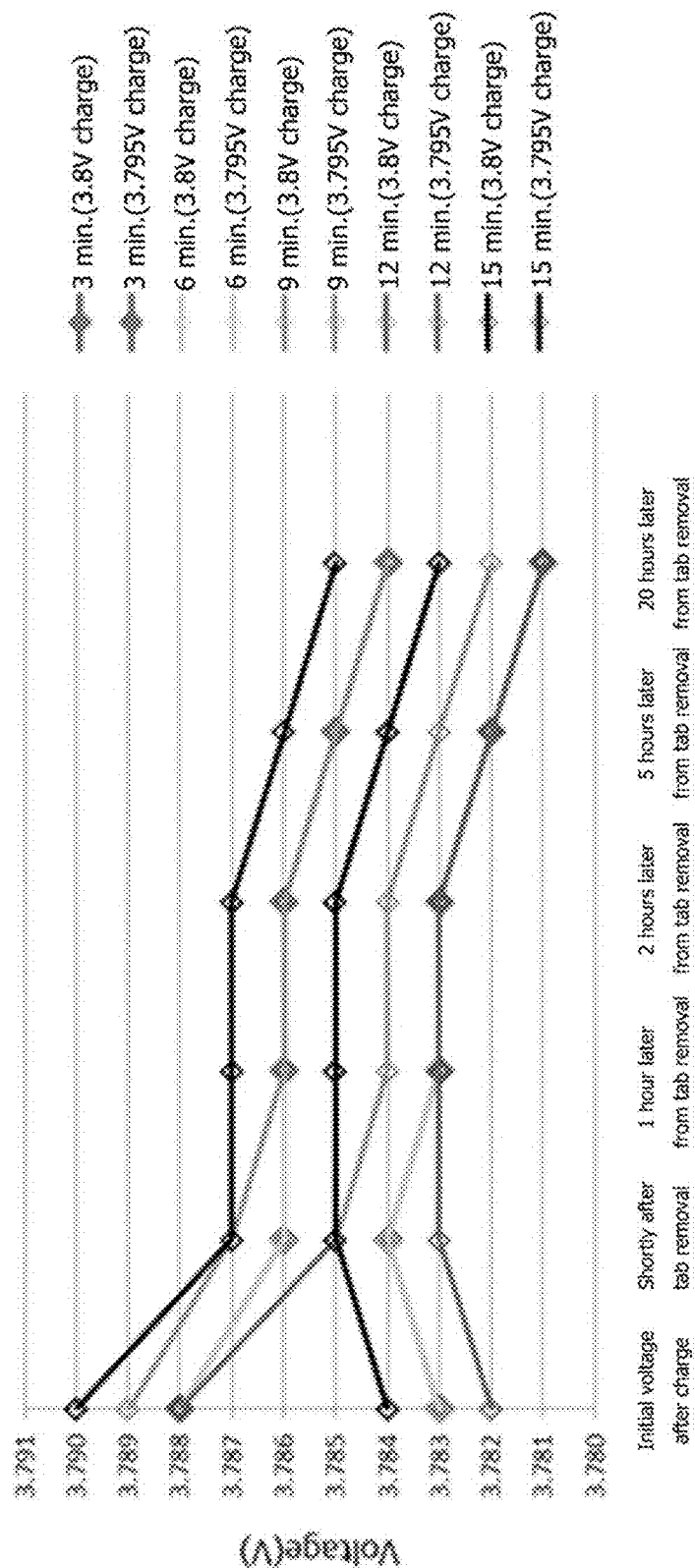
[FIG. 7]

[FIG. 8]
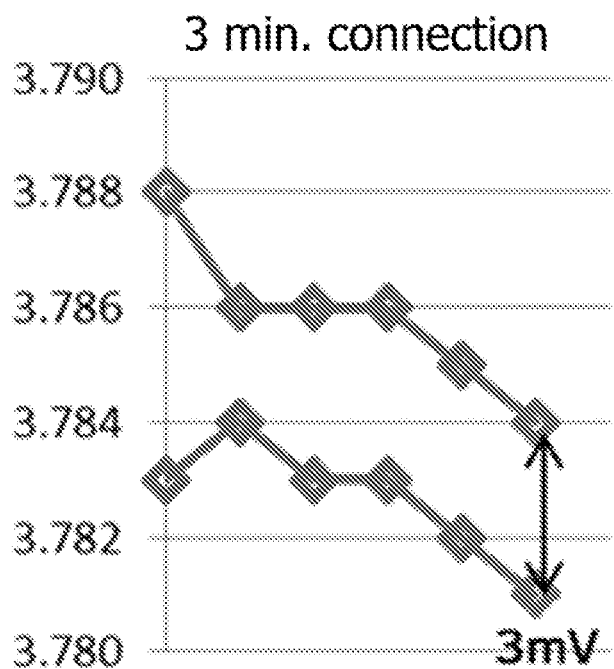
[FIG. 9]
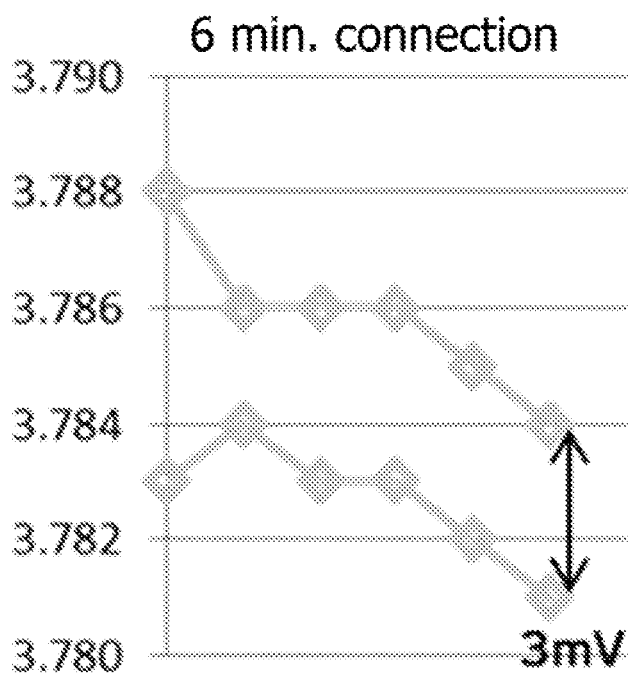

[FIG. 10]
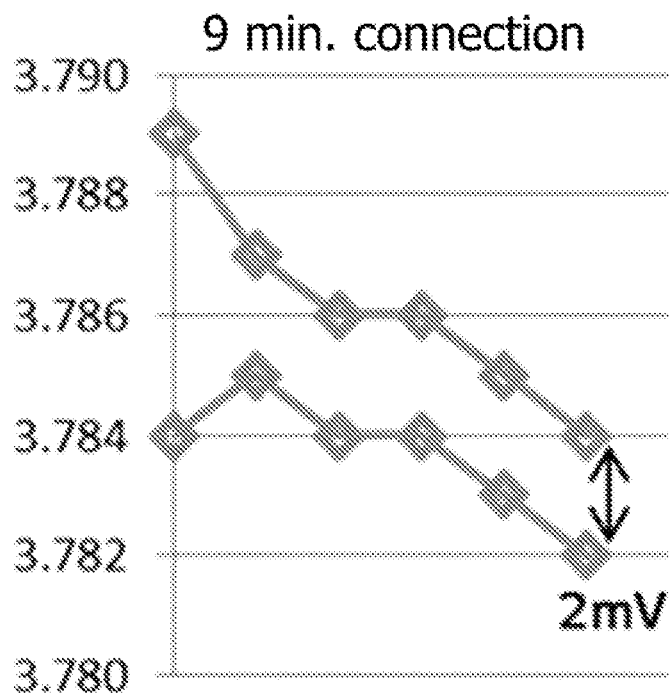
[FIG. 11]
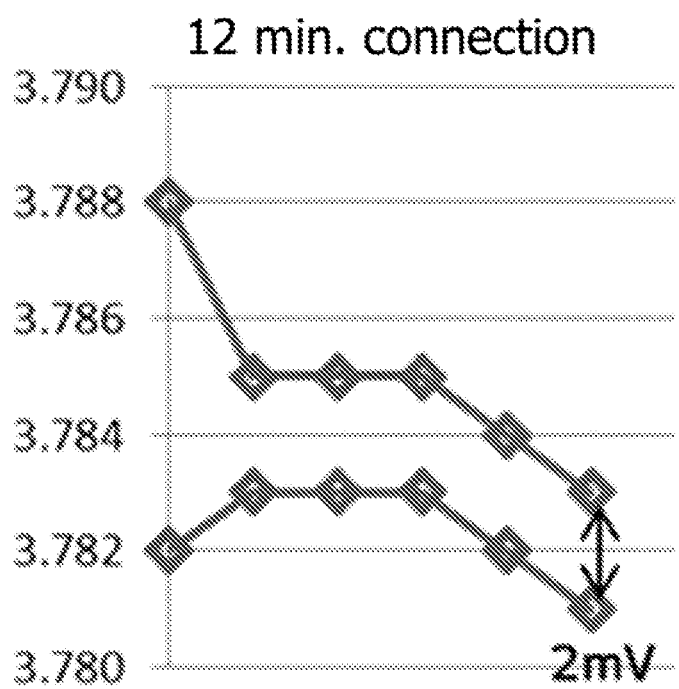

[FIG. 12]
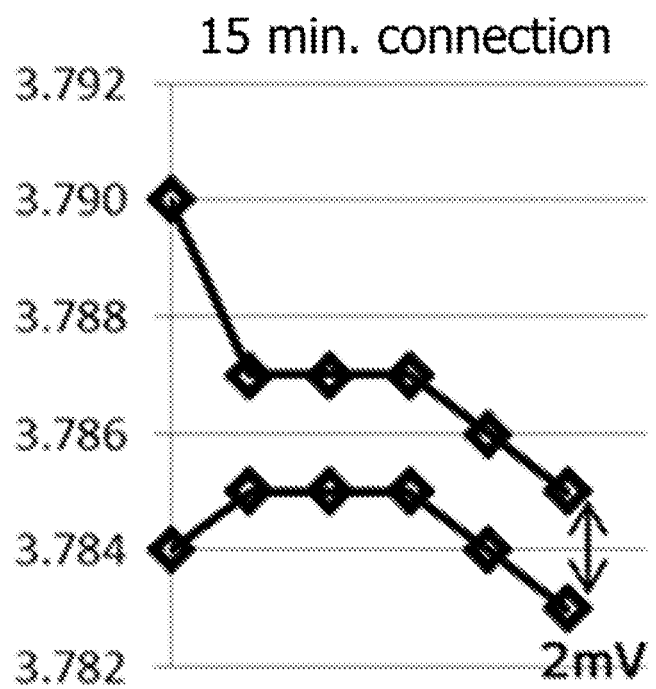

METHOD OF BATTERY CELL ACTIVATION USING ACTIVATION TRAY

INCORPORATION BY REFERENCE

Any and each application to which a priority claim is made in the Application Data Sheet is hereby incorporated by reference in its entirety.

FIELD

The present invention relates to a method for charging a secondary battery with a reduced charging time, and more specifically, a charging method of a secondary battery capable of shortening the overall charging time by replacing CV charging by applying a parallel connection between cells after CC charging instead of the conventional CC-CV charging.

BACKGROUND

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

The secondary battery as described above is manufactured through a process of assembling a battery cell and a process of activating the assembled battery cell. First, the process of assembling the battery cell is performed through a process of forming an electrode assembly by interposing a separator between a positive electrode and a negative electrode, and storing the electrode assembly in a battery case and then impregnating the electrolyte. After the battery cell is impregnated with the electrolyte, a process of activating the battery cell, that is, charging the battery cell is performed.

There are various methods for charging the battery cells, but the most useful charging method is a constant current (CC)—constant voltage (CV) charging method (CC-CV charging) according to the commercialization of a lithium ion battery in 1991. The CC-CV charging method has advantages such as low capacity reduction, fast charging time, ease of operation, and low internal resistance to long life.

In the CC-CV charging method, when the voltage of the battery cell reaches a buffer voltage while charging with a constant current (CC), the charging scheme is converted into a constant voltage (CV) charging to fill the remaining battery cell capacity while lowering the charging current and, at the same time, maintaining the terminal voltage. That is, in the CC-CV charging method, the higher the charging current, the faster the voltage of the charging cell rises, and the remaining capacity after the buffering voltage is charged with a low current.

However, according to the CC-CV charging method, in the case of the constant current (CC) charging, it was easy to shorten the time to reach the buffer voltage because the voltage rise rate can be increased as the charging current is increased, but it was difficult to shorten the time required for the constant voltage (CV) charging after the buffer voltage. That is, the CV charging condition may be accompanied by a significant time extension of the charging time, which becomes the rate-decreasing step of lithium ion diffusion in the electrode during charging. This is because the concentration polarization inevitably occurs due to the prolonged diffusion, and the current may drop to a preset limit before the active material is completely consumed due to the rapid upper limit voltage.

In addition, since the shortening of the charging time increases the productivity in the production of the entire battery cell, there is a high need to develop technology to shorten the charging process.

SUMMARY

It is an object of the present invention to solve the above-mentioned problems of the prior art and the technical problems required from the past.

After continuing in-depth studies and various experiments, the inventors of the present application discovered that after the CC charging of the battery cells, when the battery cells are connected in parallel, the same effects as in the CV charging are exhibited. Accordingly, the present invention has been completed through an effect of reducing the time required for CV charging.

Therefore, an object of the present invention is to provide a charging method capable of reducing the overall secondary battery charging time by replacing the CV charging by connecting the battery cells in parallel for a time less than the normal CV charging time.

In addition, another object of the present invention is to provide an activation tray assembly including an activation tray including a terminal plate and a tray cover member capable of covering an upper portion of the tray for parallel connection of battery cells.

A method of charging a plurality of battery cells according to an embodiment of the present invention includes: placing the plurality of battery cells into an activation tray; charging the plurality of battery cells with a constant current; and connecting the plurality of battery cells in parallel after charging the battery cells with a constant current.

The connecting of the plurality of battery cells in parallel may include covering the activation tray with a tray cover member. Specifically, a first terminal plate to be connected to first electrode terminals of the plurality of battery cells may be installed in the activation tray and a second terminal plate to be connected to second electrode terminals of the plurality of battery cells may be installed in the tray cover member to connect the plurality of battery cells in parallel.

The connecting of the plurality of battery cells in parallel may eliminate charging of the plurality of battery cells with a constant voltage. A time of connecting the plurality of battery cells in parallel may be equal to or less than 25 minutes, preferably equal to or larger than 9 minutes and equal to or less than 25 minutes, and more preferably between 9 to 15 minutes.

According to another embodiment of the present invention, there is provided a method for activating a secondary battery including the method described above.

According to another embodiment of the present invention, there is provided an activation tray assembly in which a plurality battery cells may be mounted for a transfer and charging of the plurality of battery cells in a manufacturing process, the activation tray assembly including: an activation tray having an open top and configured to receive the plurality of battery cells mounted thereon; and a tray cover member corresponding to the activation tray, in which a first terminal plate is included in a lower portion of the activation tray and a second terminal plate is included in an inside of the tray cover.

The first and second terminal plates may be configured to come into contact with first and second electrodes of the plurality of battery cells to connect the plurality of battery cells in parallel. Each of the first and second terminal plates may include a charge/discharge tab or each of the first and second terminal plates may be a metal plate.

In the present invention, instead of CV charging, which takes a lot of time during the charging process of the secondary battery, charging by parallel connection between cells can bring about the same charging effect in less time than the CV charging time, and finally it is possible to obtain an effect of shortening the overall secondary battery charging time.

In addition, by including a terminal plate such as a metal plate in the tray cover member in addition to the activation tray conventionally used for parallel connection, there is an advantage of enabling parallel connection easily.

BRIEF DESCRIPTION OF THE DRAWINGS

FIG. 1 is a view showing a CC-CV charging method commonly used as a secondary battery charging method.

FIG. 2 is a schematic view of a separated activation tray assembly of the present invention.

FIG. 3 is a schematic view showing a cylindrical battery cell used in the present invention.

FIG. 4 is a schematic view showing an activation tray of the present invention.

FIG. 5 is a schematic view showing a tray cover member of the present invention.

FIG. 6 is a schematic diagram combining the activation tray assembly of the present invention.

FIG. 7 is a graph showing the voltage of a secondary battery according to an embodiment of the present invention.

FIG. 8 is a graph showing the voltage of a secondary battery after 3 minutes parallel connection according to an embodiment of the present invention.

FIG. 9 is a graph showing the voltage of a secondary battery after 6 minutes parallel connection according to an embodiment of the present invention.

FIG. 10 is a graph showing the voltage of a secondary battery after 9 minutes parallel connection according to an embodiment of the present invention.

FIG. 11 is a graph showing the voltage of a secondary battery after 12 minutes parallel connection according to an embodiment of the present invention.

FIG. 12 is a graph showing the voltage of a secondary battery after 15 minutes parallel connection according to an embodiment of the present invention.

DETAILED DESCRIPTION OF EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application. In addition, in the description of the present invention, when it is determined that related known technologies may obscure the subject matter of the present invention, detailed descriptions thereof will be omitted.

A charging method of a commonly used secondary battery is a constant current-constant voltage (CC-CV) charging method, and FIG. 1 is a view showing such a CC-CV charging method. The CC-CV charging method is largely composed of two steps as shown in FIG. 1.

First, it is a constant current (CC) charging, which is a process in which the charger gradually increases the voltage to maintain a constant current and supplies current until a limit voltage is reached. After constant current charging, constant voltage (CV) charging is performed. This is the process of supplying current until the current becomes lower than the threshold current value (End Current) while maintaining a constant voltage when the battery reaches the limit voltage. Usually, the threshold current value is known to be about 3% of the initial current value.

On the other hand, when charging two or more battery cells, after performing the CC charging, there is a problem that the charging voltage is not constant for each battery cell. That is, when charging a plurality of battery cells in a batch, it is difficult for each cell to have an equal charge voltage. This is because each cell has a different charge amount depending on the internal resistance.

This causes a variation in the charging voltage between the cells. In general, this variation is reduced through a constant voltage (CV) charging step in which a low current is applied.

However, the CV charging as described above has a problem that it takes a long time to charge the battery.

Therefore, in order to solve the above-mentioned problems, the present invention provides a charging method having the effect of reducing the charging voltage variation between cells while reducing the charging and discharging time by applying a parallel connection step to replace CV charging in the conventional CC-CV charging method.

Hereinafter, a charging method according to the present invention will be described.

The present invention provides a charging method of a secondary battery that exerts the effect of CV charging and simultaneously reduces the charging time by connecting the battery cells in parallel after performing the CC charging.

The charging method of a secondary battery according to an embodiment of the present invention includes: putting a plurality of battery cells into the activation tray and charging the battery cells with a constant current (CC); and connecting the plurality of battery cells in parallel.

First, a plurality of battery cells are put in an activation tray, and then CC charging is performed first. The battery cell is not particularly limited as a secondary battery, and may be a lithium ion battery as a lithium secondary battery, a lithium polymer battery, or a lithium ion polymer battery.

The secondary battery usable in the present invention is not particularly limited, and may be preferably a lithium secondary battery composed of a positive electrode, a negative electrode, a separator, and a lithium salt-containing non-aqueous electrolyte.

Specifically, it may be a secondary battery in which an electrode assembly is embedded in the battery case, in which the electrode assembly includes two or more unit electrodes including a positive electrode and a negative electrode and are wound in a state that a separator is interposed between the unit electrodes. The secondary battery may be a cylindrical, square or pouch type secondary battery.

In the CC charging step of the present invention, CC charging is performed from an initial charging voltage, which is the voltage before charging the battery cell, to a voltage which is set by a person skilled in the art. The range of the charging voltage can be set in consideration of conditions such as charging performance and charging time, and may preferably be 3.5 to 4.3V, more preferably 3.75 to 4.15V. The charge voltage used in one embodiment of the present invention is 3.795 to 3.8V.

The C-rate in the CC charging step may have various ranges according to various factors such as capacity or loading of the battery cell. As a preferred example, in the present invention, it may be 0.1C to 1.0C, and its value may vary depending on the material design of the battery.

The C-rate (current rate) is a unit for predicting or notifying the possible use time of the battery and setting the current value under various use conditions when charging and discharging the battery, and the charge or discharge current is divided by the battery rated capacity to calculate the charge and discharge current value. C is used as the C-rate unit and can be defined as follows.

$$C\text{-rate} = \text{charge \& discharge current/rated capacity of the battery}$$

Then, the step of connecting the plurality of battery cells in parallel is performed.

In the present invention, at least two or more battery cells can be connected in parallel.

The step of connecting the battery cells in parallel may include being connected in parallel by covering the activation tray into which the battery cells are inserted with a tray cover member, and in the present invention, an activation tray assembly can be used to accomplish this.

According to an embodiment of the present invention, it is an object to provide an activation tray assembly 100 for performing the parallel connection.

Referring to FIG. 2, the activation tray assembly 100 includes an activation tray 110 having an open top and a plurality of cylindrical battery cells 200 mounted thereon; and a tray cover member 120 corresponding to the activation tray.

First, the activation tray 110 is configured to include an insertion hole into which a plurality of battery cells are inserted. The activation tray 110 is generally a regular cube or a cuboid, and the top surface of the tray is open, and a hole of a certain depth is formed inside so that a plurality of seating grooves 140 that allow a plurality of battery cells 200 to be inserted are regularly formed. By inserting a battery cell into the seating groove, left and right movements of the battery cell can be prevented. The number of seating grooves is 256 (16×16) in FIG. 2, but is not limited thereto, and anything capable of accepting a plurality of battery cells may be used.

The shape of the seating groove 140 of the activation tray 110 of the present invention may correspond to the shape of the battery cell. For example, when the cylindrical battery cell 200 is used, a hole having a cylindrical shape corresponding thereto may be may be formed as the seating groove 140. This is not limited, and is sufficient in the case of a shape capable of fixing it according to the shape of the battery cell. In the case of a rectangular battery, a cuboid-shaped hole in contact with the outer surface of the rectangular battery may be formed. In the present invention, a cylindrical battery cell will be described as an embodiment as shown in FIG. 3. Referring to FIG. 3, the cap assembly 210 is on the upper surface of the cylindrical battery cell 200, and the lower cap 220 is on the lower end. The parallel connection between the battery cells in the present invention means that the cap assemblies 210 or the lower caps 220 are connected to each other.

The general activation tray has a structure capable of moving and charging and discharging a plurality of battery cells accommodated, and in the present invention, the terminal plate 130 may be provided on the activation tray 110 contacting one surface of the battery cell 200. Referring to FIG. 4, a charge/discharge tab 130*a* that is in contact with an electrode (or lower cap 220) of one surface of the battery cell may be provided for each seating groove 140 in which the battery cell is provided. As another example, the metal plate 130*b* may be provided on the lower surface of the activation tray contacting one electrode (or the lower cap 220) of the plurality of battery cells.

Meanwhile, the tray cover member 120 may be covered with an open top of the activation tray 110 for a parallel connection. The tray cover member 120 has a size and shape corresponding to the activation tray 110.

The tray cover member 120 may be installed to be detachable on the upper surface of the activation tray 110. The tray cover member 120 may be sized to cover the plurality of holes of the seating grooves 140 of the activation tray 110.

Specifically, referring to FIG. 5, one side of the tray cover member 120 may be formed with a fixing groove 150 for each portion where a battery cell is located, as in the activation tray 110, so that when the activation tray 110 and the tray cover member 120 are combined, the battery cell can be fixed. In addition, the inside of the tray cover member 120 may be provided with a terminal plate 130 in contact with one surface (or cap plate 210) of the battery cell seated in the fixing groove 150. As an example, a fixing groove 150 is formed inside the tray cover member 120 corresponding to the seating groove 140 in which each battery cell is provided, and one surface of the fixing groove 150 is provided with a charge/discharge tab 130*a* as an example of the terminal plate 130 so that each battery cell can be connected to each other in parallel. As another example, by providing a metal plate 130*b* inside the tray cover member 120, one side of the battery cell provided for each fixing groove 150 is connected to the metal plate, so that a parallel structure can be used.

In summary, the terminal plate 130 may be provided below the activation tray 110 provided with a plurality of battery cells, and at the same time, the terminal plate 130 is also provided inside the tray cover member 120 in contact with each electrode of the plurality of battery cells mounted on the activation tray 110. Once the battery cells are loaded into the holes of the seating grooves 140 of the activation tray 110, the holes and the second terminal of each of the battery cells are exposed until placing the tray cover member 120 over the activation tray 110.

Due to this, after the battery cells 200 are input to the activation tray 110, the electrodes of the battery cells are connected to each other by covering the tray cover member 120 so that parallel connection between cells can be automatically performed.

That is, the present invention provides an activation tray assembly 100 respectively including a terminal plate for realizing parallel connection of the electrode of respective battery cells inside an activation tray equipped with a plurality of battery cells and a tray cover member covering the activation tray as illustrated in FIG. 6.

In the present invention, a charge/discharge tab 130a (see 100A) or a metal plate 130b (see 100B) may be used as the terminal plate 130 of FIG. 6, but is not limited thereto, and any means capable of connecting the battery cells in parallel may be used.

On the other hand, the present invention is characterized in that it replaces the conventional CV charging through the step of connecting in parallel after performing CC charging. This is characterized in that the parallel connection time is shorter than the time required for CV charging while exerting the same effect of reducing the voltage deviation between cells through the process of parallel connection after performing CC charging.

The step of connecting in parallel is preferably 25 minutes or less, more preferably a minimum of 9 minutes to a maximum of 25 minutes, and more preferably a minimum of 9 minutes and a maximum of 15 minutes. When the time required for the step of connecting in parallel exceeds 25 minutes, there is no significant difference from the CV charging time, so the effect of shortening the charging time intended in the present invention cannot be exhibited.

Meanwhile, in the present invention, a method for activating a secondary battery including the charging method may be provided.

The method of activating the secondary battery may include injecting an electrolyte into an electrode assembly, aging a battery cell in which the electrolyte has been injected, charging the battery cell in which aging has been completed, and degassing the battery cell in which charging has been completed.

Specifically, in manufacturing a general lithium secondary battery, first, a positive electrode and a negative electrode are prepared by applying a mixture of an active material, a binder, and a plasticizer to a positive electrode current collector and a negative electrode current collector, and this is stacked on both sides of the separator to form a battery cell of a predetermined shape, and then the battery cell is inserted into the battery case and sealed. In addition, in order to determine whether the secondary battery is defective and to ensure stability of performance, especially life, an activation process should be performed before shipment of the product.

While the activation process is performed, first, an aging process is performed. The aging process is a process of aging the secondary battery for a certain period of time at a specified temperature and humidity, in which by aging the secondary battery at room temperature and/or high temperature, the electrolyte inside the secondary battery is sufficiently impregnated in the electrode material to thereby optimize the movement of lithium ions.

After the aging process, the activation process performs a filling process. When charging, lithium ions from lithium metal oxide used as a positive electrode are moved and inserted into a carbon (crystalline or amorphous) electrode used as a negative electrode. At this time, since lithium is highly reactive, it reacts at the carbon negative electrode to produce compounds such as $Li_2CO_3$, LiO, and LiOH. These are processes for forming a solid electrolyte interface (SEI) film on the negative electrode surface. That is, during the activation process, the charging process is to stabilize the structure of the electrode by forming an SEI film on the electrode (specifically, a negative electrode). The SEI film serves to transfer lithium ions at the electrode-electrolyte interface, and helps to move lithium ions under uniform current distribution by alleviating overvoltage and securing uniform particle size and chemical composition. Hence, a secondary battery is set to be usable for a long time.

After the charging process, a degassing step may be further included, in which the side reaction gas generated inside the battery is removed. During the aging process, gas is generated inside the battery, and the generated gas may cause a swelling of the battery, and thus a degassing process may be performed. The degassing process may be performed by opening the sealing of the battery case or by providing a separate gas removing tool. If the degassing is performed by opening the battery case, the opened part may be resealed.

When performing the step of charging the battery cell having aging completed during the activation process according to the charging method of the present invention, there is an advantage of reducing the time required for the overall activation process.

The secondary battery usable in the present invention is not particularly limited, and may be preferably a lithium secondary battery composed of a positive electrode, a negative electrode, a separator, and a lithium salt-containing non-aqueous electrolyte.

Specifically, it may be a secondary battery in which an electrode assembly is embedded in the battery case, in which the electrode assembly includes two or more unit electrodes including a positive electrode and a negative electrode and are wound in a state that a separator is interposed between the unit electrodes. The secondary battery may be a cylindrical, square or pouch type secondary battery.

The unit electrode may be manufactured by applying an electrode mixture containing an electrode active material on a current collector and then drying the electrode mixture. The electrode mixture may further include a binder, a conductive material, a filler, and the like, as necessary.

Both weak magnetic and nonmagnetic metal ultrathins may be used as the current collector. The positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, or aluminum or stainless steel of which the surface has been treated with carbon, nickel, titanium, silver, or the like. The current collector may have fine irregularities on the surface thereof to increase the adhesion of the positive electrode active material, and various forms such as a sheet, a foil, and a net are possible.

The negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a sheet, a foil, and a net.

The positive electrode active material is a material capable of causing an electrochemical reaction and a lithium transition metal oxide, and contains two or more transition metals. Examples thereof include: layered compounds such as lithium cobalt oxide (LiCoO2) and lithium nickel oxide (LiNiO2) substituted with one or more transition metals;

lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1-z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq +0.5$, $0 \leq y \leq 0.5$, $0 \leq z \leq 0.1$).

As the negative electrode active material, for example, carbon such as non-graphitized carbon, graphite carbon, carbon black, acetylene black, ketjen black, channel black, furnace black, lamp black, summer black, graphene, or graphite; metal complex oxide of $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, group 1, 2, and 3 elements of the periodic table, halogen; $0<x \leq 1$; $1 \leq y \leq 3$; $1 \leq z \leq 8$); lithium metal; lithium alloy; silicon-based alloy; tin alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer such as polyacetylene; Li—Co—Ni-based material, etc. may be used.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The lithium salt-containing non-aqueous electrolyte consists of an electrolyte and a lithium salt. And a non-aqueous organic solvent, an organic solid electrolyte, an inorganic solid electrolyte, and the like are used as the electrolyte solution.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a substance that is soluble in the non-aqueous electrolyte. The examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one preferred example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

According to the present invention, a battery pack, a device and the like including the secondary battery as a unit battery may be provided. Specifically, the device may be selected from the group consisting of a mobile phone, a portable computer, a smart phone, a smart pad, a netbook, an electric vehicle, a hybrid electric vehicle, a plug-in hybrid electric vehicle, and a power storage device.

Hereinafter, the present invention will be described in detail with reference to examples. However, the embodiments according to the present invention may be modified into various other forms, and the scope of the present invention should not be construed as being limited to the embodiments described below. The embodiments of the present invention are provided to more fully describe the present invention to those skilled in the art.

EXAMPLES

First, after storing 256 cylindrical battery cells (16×16) in an activation tray, CC charging was performed under the conditions of 1.0 C and 1444 Ah, and the variation in the charging voltage of the cylindrical battery cells was measured. At this time, it was confirmed that the maximum deviation of the charging voltage between cells was 5 mV.

Thereafter, ten cylindrical battery cells in which charging has not been performed are prepared.

After confirming that the maximum deviation of the charging voltage between the cells is 5 mV, the charging voltage variation between the cells is induced to the CC/CV charging box to be 5 mV.

Specifically, CC/CV charging was performed for 5 cells at 3.8V (0.1 C, 50 mA Cut-Off condition), and CC/CV charging was performed for other 5 cells at 3.795V (0.1 C, 50 mA Cut-Off condition), by which the difference in charging voltage of 5 mV between the two groups was induced.

Subsequently, a total of 5 sets were prepared using 2 cells, one of each of 5 cells of 3.8V charging and 5 cells of 3.795V charging as one set. The difference in charging voltage of the battery cells for each set was confirmed in Table 1 below.

TABLE 1

| Set No. | 3.8 V charging cell voltage (V) | 3.795 V charging cell voltage (V) | Voltage difference (V) |
|---|---|---|---|
| 1 | 3.788 | 3.783 | 0.005 |
| 2 | 3.788 | 3.783 | 0.005 |
| 3 | 3.789 | 3.784 | 0.005 |
| 4 | 3.788 | 3.782 | 0.006 |
| 5 | 3.790 | 3.784 | 0.006 |

In the sets 1 to 5, the voltage difference was 0.005 to 0.006V, and the battery cells of each set were connected in parallel. After inserting each battery cell into the activation tray, and then a parallel connection was performed by covering the tray cover member. At this time, the activation tray and the tray cover member are equipped with a charge/discharge tab as a terminal plate. After receiving the battery cells in the activation tray, the tray cover member was covered to connect each battery cell in parallel by a charge/discharge tab, and the parallel connection time for each set was set differently and shown in Table 2.

TABLE 2

| Set No. | Parallel connection time |
|---|---|
| 1 | 3 min. |
| 2 | 6 min. |
| 3 | 9 min. |
| 4 | 12 min. |
| 5 | 15 min. |

As shown in Table 2, after adjusting the time for parallel connection by covering the tray cover member for each set, voltage was measured in parallel connection. In addition, immediately after removing the charge/discharge tab (separating the tray cover member from the activation tray), the voltage of the battery cells measured after 1 hour, 2 and a half hours, 5 hours and 20 hours after the tab removal was monitored, and the results are shown in Table 3 and FIGS. 7 to 12.

TABLE 3

| Division | Elapsed time after tab removal | 3.8 V charging cell voltage (V) | 3.795 V charging cell voltage (V) | Voltage difference (V) | Voltage in parallel connection |
|---|---|---|---|---|---|
| Set 1 | Initial voltage | 3.788 | 3.783 | 0.005 | 3.785 V |
| Parallel | Shortly after | 3.786 | 3.784 | 0.002 | |
| connection | 1 hour later | 3.786 | 3.783 | 0.003 | |
| 3 minutes | 2.5 hours later | 3.786 | 3.783 | 0.003 | |
| | 5 hours later | 3.785 | 3.782 | 0.003 | |
| | 20 hours later | 3.784 | 3.781 | 0.003 | |
| Set 2 | Initial voltage | 3.788 | 3.783 | 0.005 | 3.785 V |
| Parallel | Shortly after | 3.786 | 3.784 | 0.002 | |
| connection | 1 hour later | 3.786 | 3.783 | 0.003 | |
| 6 minutes | 2.5 hours later | 3.786 | 3.783 | 0.003 | |
| | 5 hours later | 3.785 | 3.782 | 0.003 | |
| | 20 hours later | 3.784 | 3.781 | 0.003 | |
| Set 3 | Initial voltage | 3.789 | 3.784 | 0.005 | 3.786 V |
| Parallel | Shortly after | 3.787 | 3.785 | 0.002 | |
| connection | 1 hour later | 3.786 | 3.784 | 0.002 | |
| 9 minutes | 2.5 hours later | 3.786 | 3.784 | 0.002 | |
| | 5 hours later | 3.785 | 3.783 | 0.002 | |
| | 20 hours later | 3.784 | 3.782 | 0.002 | |

TABLE 3-continued

| Division | Elapsed time after tab removal | 3.8 V charging cell voltage (V) | 3.795 V charging cell voltage (V) | Voltage difference (V) | Voltage in parallel connection |
|---|---|---|---|---|---|
| Set 4 | Initial voltage | 3.788 | 3.782 | 0.006 | 3.785 V |
| Parallel | Shortly after | 3.785 | 3.783 | 0.002 | |
| connection | 1 hour later | 3.785 | 3.783 | 0.002 | |
| 12 minutes | 2.5 hours later | 3.785 | 3.783 | 0.002 | |
| | 5 hours later | 3.784 | 3.782 | 0.002 | |
| | 20 hours later | 3.783 | 3.781 | 0.002 | |
| Set 5 | Initial voltage | 3.790 | 3.784 | 0.006 | 3.786 V |
| Parallel | Shortly after | 3.787 | 3.785 | 0.002 | |
| connection | 1 hour later | 3.787 | 3.785 | 0.002 | |
| 15 minutes | 2.5 hours later | 3.787 | 3.785 | 0.002 | |
| | 5 hours later | .3.786 | 3.784 | 0.002 | |
| | 20 hours later | 3.785 | 3.783 | 0.002 | |

Table 3 and FIG. 7 show the result of checking the voltage difference according to the cell parallel connection time, and it is confirmed that the initial voltage difference for each set is 0.005 to 0.006V. Thereafter, referring to FIGS. 8 to 12, it can be seen that the slope between the two cells becomes the same from the time after 1 hour of tab removal for each set. Particularly, in the case of sets 3, 4, and 5 (FIGS. 10 to 12) in which parallel connection was performed for 9 to 15 minutes, it can be seen that the voltage difference between cells was reduced to a minimum level of 2 mV.

This is because a battery cell with a high voltage can function as a power source for a battery cell with a low voltage.

Specifically, in the case of connecting battery cells in parallel, it can be seen that alternatively, 9 minutes is an optimized time, and the voltage gradient at 12 minutes and 15 minutes and the voltage difference between cells are not significantly different from those at 9 minutes, and thus the ideal cell parallel connection time is 9 minutes.

The CV charging time is generally 26 minutes, but it can be confirmed that through the process of connecting the battery cells in parallel in the present invention, it is possible to effectively shorten the charging time to at least 9 minutes. In embodiments, placing the tray cover over the activation tray 110 may be continued for a period of time sufficient to decrease a voltage difference between the first battery cell and the second battery cell to 2 to 3 mV.

In the charging method of the battery cell as above, when performing the steps of parallel connection between cells after CC charging, the voltage difference between cells decreases and the voltage slope becomes constant, and thus not only can it replace the CV charging, but also requires less time than the CV charging time, which can exert an effect of reducing the overall charging time.

In the above, the present invention has been described in detail with reference to the described examples, but it is natural that a person having ordinary knowledge in the technical field to which the present invention pertains is capable of performing various substitutions, additions, and modifications without departing from the technical spirit described above, and it should be understood that these modified embodiments also belong to the protection scope of the present invention as defined by the appended claims.

DESCRIPTION OF REFERENCE NUMERALS

100, 100A, 100B: tray assembly
110: activation tray
120: tray cover member
130: terminal plate
130a: charge/discharge tab
130b: metal plate
140: seating groove
150: fixing groove
200: cylindrical battery cell
210: cap assembly
220: lower cap

What is claimed is:

1. A method of battery cell activation, the method comprising:
   providing an activation tray comprising a tray body, a tray conductive device installed in the tray body, and a plurality of battery insertion holes formed in the tray body, wherein each battery insertion hole is configured to receive a battery cell, wherein the tray conductive device comprises a first electrically conductive portion exposed inside each battery insertion hole;
   providing a tray cover comprising a cover body sized to cover the plurality of battery insertion holes of the activation tray and a cover conductive device installed in the cover body;
   providing battery cells each comprising an elongated body, a first terminal at a first end of the elongated body, and a second terminal at a second end of the elongated body;
   inserting the battery cells into at least part of the plurality of battery insertion holes such that the first terminal of each of the battery cells contacts the first electrically conductive portion exposed inside one of the at least part of the plurality of battery insertion holes to form an electric connection to the tray conductive device;
   subsequently performing constant current charging for the battery cells in the activation tray in a batch, wherein upon completion of the constant current charging, there is a voltage variation among at least part of the battery cells such that a first one of the battery cells has a first voltage and a second one of the battery cells has a second voltage that is lower than the first voltage; and
   subsequently placing the tray cover over the activation tray to cover the plurality of battery insertion holes such that the second terminal of each battery cell in the activation tray contacts an electrically conductive portion of the cover conductive device of the tray cover, whereby the battery cells in the activation tray are electrically connected in parallel between the tray conductive device of the activation tray and the cover conductive device of the tray cover for reducing the voltage variation without performing constant voltage charging for the battery cells, in which the first battery cell having the first voltage works as a power source for charging the second battery cell having the second voltage.

2. The method of claim 1, wherein the battery cell activation does not comprise constant voltage charging subsequent to the constant current charging.

3. The method of claim 1, wherein the constant current charging is performed using at least one charger to a voltage level of 3.5 to 4.3 V.

4. The method of claim 1, wherein the plurality of battery insertion holes and the second terminal of each of the battery cells in the activation tray are exposed until placing the tray cover over the activation tray.

5. The method of claim 1, wherein the cover conductive device comprises an electrically conductive plate, wherein the electrically conductive portion that the second terminal of each battery contacts is a portion of the electrically conductive plate.

6. The method of claim 1, wherein the cover conductive device comprises a plurality of electrically conductive tabs, wherein the electrically conductive portion that the second terminal of each battery contacts is one of the plurality of electrically conductive tabs.

7. The method of claim 1, wherein the tray conductive device comprises an electrically conductive plate, and wherein the first electrically conductive portion exposed inside each battery insertion hole is a portion of the electrically conductive plate.

8. The method of claim 1, wherein the tray conductive device comprises a plurality of electrically conductive tabs, wherein each of the plurality of electrically conductive tabs is provided at a bottom of one of the plurality of battery insertion holes and works as the first electrically conductive portion.

9. The method of claim 1, wherein placing the tray cover over the activation tray is continued for 9 to 15 minutes during which the battery cells in the activation tray are connected in parallel for reducing the voltage variation without constant voltage charging for the battery cells.

10. The method of claim 1, wherein placing the tray cover over the activation tray is continued for a period of time sufficient to decrease a voltage difference between the first battery cell and the second battery cell to 2 to 3 mV.

* * * * *

UNITED STATES PATENT AND TRADEMARK OFFICE
CERTIFICATE OF CORRECTION

| | | |
|---|---|---|
| PATENT NO. | : 12,212,164 B2 | Page 1 of 1 |
| APPLICATION NO. | : 18/516920 | |
| DATED | : January 28, 2025 | |
| INVENTOR(S) | : So Hee Kim et al. | |

It is certified that error appears in the above-identified patent and that said Letters Patent is hereby corrected as shown below:

In the Claims

In Claim 2, at Column 15, Lines 4-5, replace "wherein the battery cell activation" with -- wherein the method --.

In Claim 5, at Column 15, Line 17, replace "each battery" with -- each battery cell --.

Signed and Sealed this
Twenty-fifth Day of March, 2025

Coke Morgan Stewart
*Acting Director of the United States Patent and Trademark Office*